United States Patent Office.

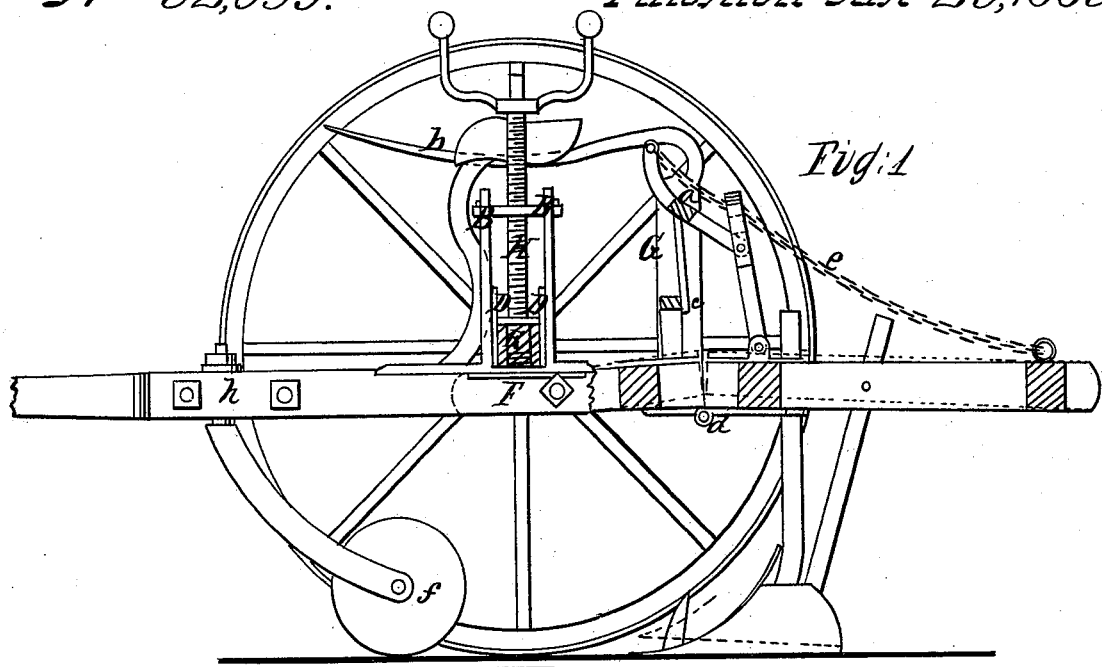

WILLIAM B. RICE, OF OAKLAND, OREGON.

Letters Patent No. 92,099, dated June 29, 1869.

IMPROVEMENT IN GANG-PLOWS.

The Schedule referred to in these Letters Patent and making part of the same.

*To whom it may concern:*

Be it known that I, WILLIAM B. RICE, of Oakland, Douglas county, in the State of Oregon, have invented a new and improved Method of Working Gang-Plows; and I do hereby declare that the following is a full and exact description thereof, reference being had to the accompanying drawings, and to the letters of reference marked thereon.

The great advantage of my invention consists of the great simplicity of its machinery, and consequent durability, straight wooden axle-tree, and large wheels, which cause it to run steadier on uneven ground.

Axle-tree on the top of beams and platform, making the draught direct on the beams.

Leverage, which regulates the raising and lowering of the plows.

Screw-power, which regulates the depth of plowing.

Temper-holes, which regulate the taking or giving of land.

To enable others skilled in the art to make and use my invention, I will proceed to describe its construction and operation.

Figure 1 is a sectional side elevation of my machine, and

Figure 2 is a top view of the same.

A are temper-holes for giving or taking land.

B, uprights which hold the axle-tree and screw to p'ace on land-side.

C, hinges on furrow-side to hold axle-tree and platform together.

D, plates on side of axle-tree, with slot cut in them to prevent turning, so that the screw will stand perpendicular at any depth of plowing.

E, slot in axle-tree for screw to work in.

F, plate let into platform to hold bottom of screw.

G, uprights for roller.

H, screw which regulates depth of plowing.

a, roller for raising plows out.

b, lever.

c, leverage to hold plow-beams down while plowing.

d d, hinges for raising points of plows out first.

e, chain for raising the heel of plows up when out of ground.

f, wheel, so constructed as to put on the hind end of the pole at h, while plowing, to take the weight off the horses' necks, and also to put on the hind end of the beams at g, when going from place to place.

Before plowing, screw down the left plow to whatever depth it is desired to plow. Lay off the land to be plowed. The next round, the right-hand wheel drops into the furrow, making the beams level when both plows cut. At any time, if it is desired to plow deeper, turn the screw H when, the next round, both plows will cut to depth regulated by the screw.

Claim.

What I claim as my invention, and wish to secure by Letters Patent, is—

The temper-holes A, in combination with the uprights B, hinges C, plates D, slot E, plate F, uprights for rollers G, screw H, lever b, leverage c, hinges d d, chain e, wheel f, all substantially as set forth and described.

WILLIAM B. RICE.

Witnesses:
PHILIP CARWELL,
B. HERMAN.